United States Patent [19]

Boudenant et al.

[11] 4,283,363
[45] Aug. 11, 1981

[54] PROCESS FOR MANUFACTURE OF PLASTIC SHEETS

[75] Inventors: Pierre Boudenant, Elisabethville, France; Heinz Scholl, Eschiveiler, Fed. Rep. of Germany; Michel Zortea, Chalon sur Saone, France

[73] Assignee: Saint-Gobain Industries, Paris, France

[21] Appl. No.: 96,294

[22] Filed: Nov. 21, 1979

[30] Foreign Application Priority Data

Nov. 12, 1978 [FR] France ................................ 78 33060

[51] Int. Cl.³ .......................... B29D 7/02; B29D 9/00
[52] U.S. Cl. ...................................... 264/171; 264/1.1; 264/212; 264/216; 264/236; 264/240; 264/338; 425/224
[58] Field of Search ............... 264/171, 212, 216, 338, 264/1, 236, 240; 425/224

[56] References Cited

U.S. PATENT DOCUMENTS

| | | | |
|---|---|---|---|
| 1,921,953 | 8/1933 | Stephens | 425/224 |
| 2,344,603 | 3/1944 | Czapek | 425/224 |
| 2,932,855 | 4/1960 | Bartlett et al. | 264/171 |
| 3,038,209 | 6/1962 | Hunter, Jr. et al. | 264/212 |
| 4,145,173 | 3/1979 | Pelzer et al. | 425/224 |

Primary Examiner—Jeffery R. Thurlow
Attorney, Agent, or Firm—John T. Synnestvedt; Richard D. Weber

[57] ABSTRACT

A process for making sheets of plastic material of high optical quality by casting the plastic material or a mixture of its components on a flat, moving substrate is disclosed. According to the invention, a stable pocket of material is formed on the moving substrate upstream of the zone at which the plastic material flows from the casting apparatus onto the substrate. The material in the pocket moves in predetermined paths and leaves the pocket to form the lower portion and the edges of the sheet. A direct stream of material is simultaneously formed downstream of the zone of delivery of the plastic material onto the substrate in a tangential relation to the meniscus, to form the upper portion of the sheet.

17 Claims, 4 Drawing Figures

PROCESS FOR MANUFACTURE OF PLASTIC SHEETS

FIELD OF THE INVENTION

This invention relates to the manufacture of films or sheets of transparent or translucent plastic material, having high optical quality, by depositing the plastic material in fluid form on a flat surface.

The invention relates more specifically to a new process for casting a liquid, for example, a fluid mixture of several reactants, to form a layer of plastic material on a flat, mobile surface.

BACKGROUND OF THE INVENTION

Various processes are known for forming a layer of plastic material by casting a liquid on a substrate. For instance, by forming a film drawn from a meniscus. In this case, a meniscus of material is formed and maintained by surface tension between the slot of the distributor of liquid material and the substrate. By subsequently moving the substrate, the liquid is continuously extracted from the meniscus while the meniscus is continuously resupplied by the liquid distributor. This process requires a relationship between the interfacial tension between the substrate and the liquid, on one hand, and the surface tension of the liquid on the other hand, and it cannot be used to deposit liquids which do not wet the support. Moreover, with this process, it is particularly difficult to obtain a deposit of uniform thickness. Further, defects can be caused by minute imperfections in the distribution slot. These factors militate against consistently forming a layer with good enough optical quality for use in laminated glazing, for example.

Another known process involves depositing material on a substrate by extrusion of the fluid material. In this case, all of the cast material is directly entrained by the mobile substrate for layer formation. The flow is laminar. It is difficult to obtain thin layers, i.e., on the order of a few tenths of a millimeter or less in thickness, with this technique.

Another process for depositing material on a mobile substrate for layer formation is known. In this process, the material forms a bead above the substrate which spreads in a direction opposite to the direction of advancement of the substrate. This process permits formation of a thin, uniform layer, regardless of the wetting properties of the cast fluid material. However, the bead usually contains dead zones in which the material stagnates. This is particularly troublesome when forming a transparent layer by depositing a mixture of components which react within each other during the depositing process. In this case, the material which is present in the dead zones of the bead is older than the material deposited directly on the substrate. Vibration of the substrate can cause a disturbance in the bead and its stagnant zones and, consequently, possible entrainment by the substrate of material from the stagnant zones. This results in the formation of a heterogeneous film having portions of very different ages, that are in more or less advanced stages of polymerization. Optical defects, such as streaks, are then formed and the film cannot be used in laminated glazing.

SUMMARY OF THE INVENTION

Applicants have developed a new process for obtaining a sheet of excellent optical quality and uniform thickness, and meeting automobile windshield specifications, wherein parts have substantially equivalent ages across the entire usable width of the sheet.

Applicants have determined that a sheet of plastic material can be made by casting the plastic material, or by casting a mixture of reactive components, on a movable, flat substrate that advances in a transverse direction, by forming on the substrate, upstream of the flow, a pocket or meniscus of stable material that does not have stagnant flow zones. In the meniscus, the material is in constant movement and flows freely, along an upper stream, in a direction essentially opposite to the direction of advancement of the substrate in order to come into contact with the latter and be entrained in the direction of advancement, thus forming a lower stream that becomes the bottom portion of the sheet forming layer. Material in the central portion of the pocket located between the upper and lower streams, flows more slowly, and principally laterally outwardly, towards the edges of the pocket, while a direct flow of material is simultaneously formed downstream of the zone at which the material is delivered to the substrate in a tangential relation to the pocket so as to form the upper portion of the sheet or film-forming layer.

In one aspect of the invention, a pocket of material is formed on the substrate; its width is appreciably equal to the width of the sheet being formed downstream on the substrate, its height is greater than the thickness of the finished sheet, and it exhibits a uniform convex curve, especially in a plane parallel to the substrate.

This process provides a layer, upper and lower portions of which comprise material of substantially uniform age across the entire width of the layer, with the exception of the edges. The edges contain the material that is confined for awhile in the pocket between the upper and lower paths and the direct flow and that gradually escapes therefrom by a transverse movement with respect to the direction of movement of the substrate. This material flows to the edges of the sheet and does not impair the quality of the remainder of this layer because it is located in parts of the layer which will subsequently be eliminated.

In another aspect of the invention, a stable pocket of material, with the above-described characteristics, is formed on a flat casting substrate in the following manner. As essentially horizontal flat casting substrate is used; its surface adheres partially to the cast material so that the movement of the substrate results in the entrainment of material; the substrate is provided with a relatively uniform forward movement; a thin, continuous sheet-like stream of material is formed and delivered onto the substrate in a direction transverse to the direction of movement of the substrate, the transverse dimension of the stream so formed being slightly narrower than that of the layer being formed; it is preferable that there be a continuous decrease in pressure from the center to the lateral edges of the stream so that desired flow patterns within the pocket are achieved; a head loss is created to prevent the material from flowing freely downstream; adherence of the cast material to the surface of the substrate is controlled so that it is not too low, otherwise poor entrainment of the material ensues and the pocket has no stability—this results in the formation of lens-like distortions on the surface of the layer in contact with the substrate. However, adherence must not be too great, otherwise the layer formed after polymerization cannot be detached from the substrate or might be damaged when detached.

As previously stated, according to the invention, a portion of the material delivered to the substrate is directly entrained by the latter in the direction of movement of said substrate; another portion of the material forms the pocket or meniscus, feeding it continuously and regularly in order to maintain it in the above-described state of stability. Casting, in the form of a thin and continuous sheet of material, can be done by means of a long and narrow vertical or slanted slot from which the substance emerges at a pressure which decreases in a uniform manner from the center to the lateral edges. In order to create this pressure gradient between the center and the edges, the slot can be provided with a cross section which gradually narrows toward the edges; thus, the flow of material is greater in the central portion of the slot than at the edges. The slot can also be supplied with material by a single inlet. It is preferable that this single inlet be centrally located. In this manner, the streams of material will be symmetrical with respect to the median plane orthogonal to the casting line. Finally, the two edges of the sheet which contain the material with a longer residence time in the meniscus will be of equal size and narrow width.

The casting slot outlet must be arranged so that the sheet-like stream of flowing material is continuous across the entire width of the slot. Too great a distance between the slot outlet and the casting substrate can cause a break in the continuous sheet and formation of thin streams of material, resulting in a loss of stability of the pocket.

Other characteristics and advantages of the invention will appear in the following description, made with reference to the figures.

DESCRIPTION OF THE PREFERRED EMBODIMENT

Figure 1:
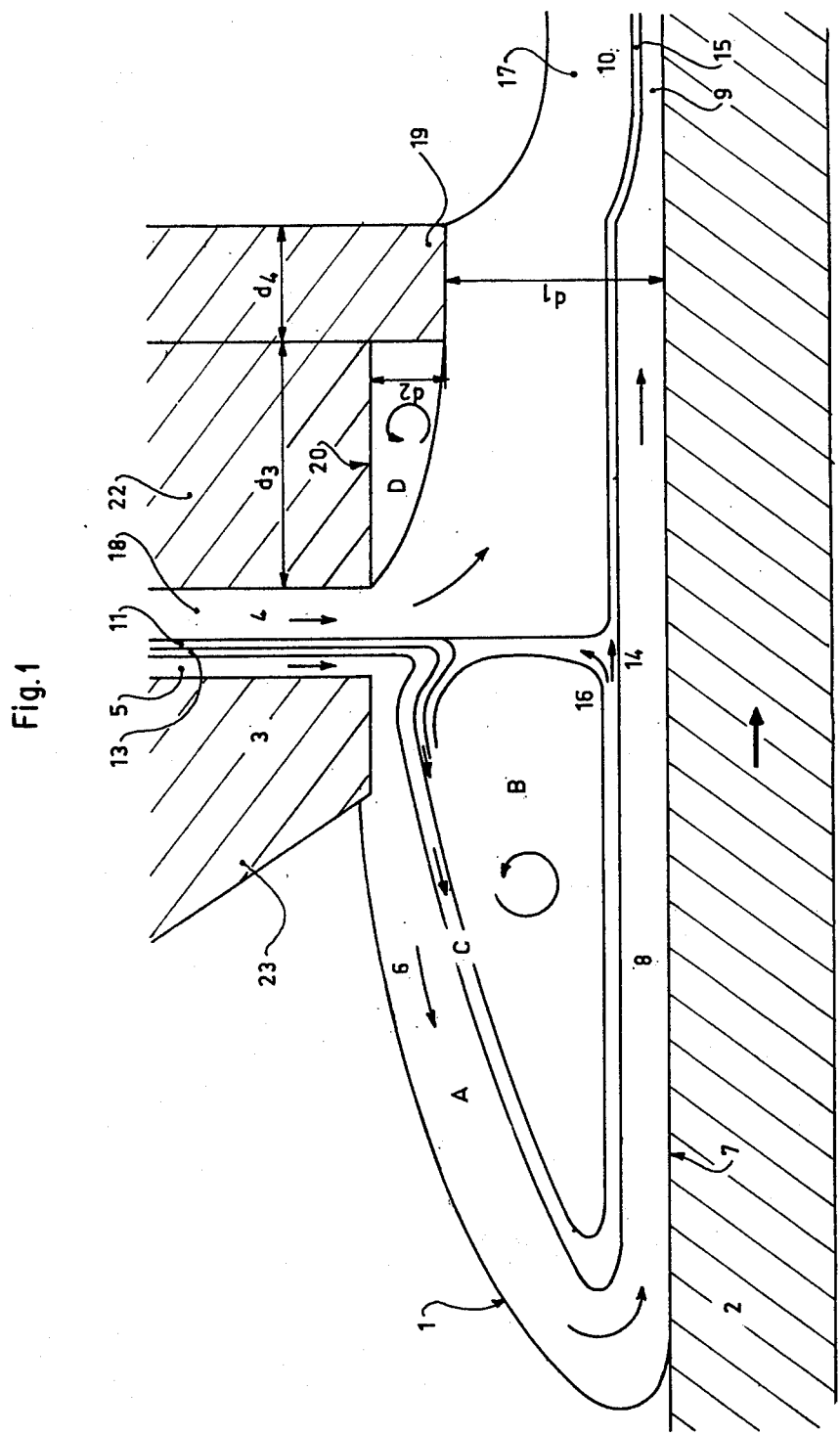
FIG. 1 illustrates the process of the invention and shows, in elevation, a section parallel to the direction of movement of the substrate, the paths of flow of material which is delivered onto the casting substrate.
Figure 2:
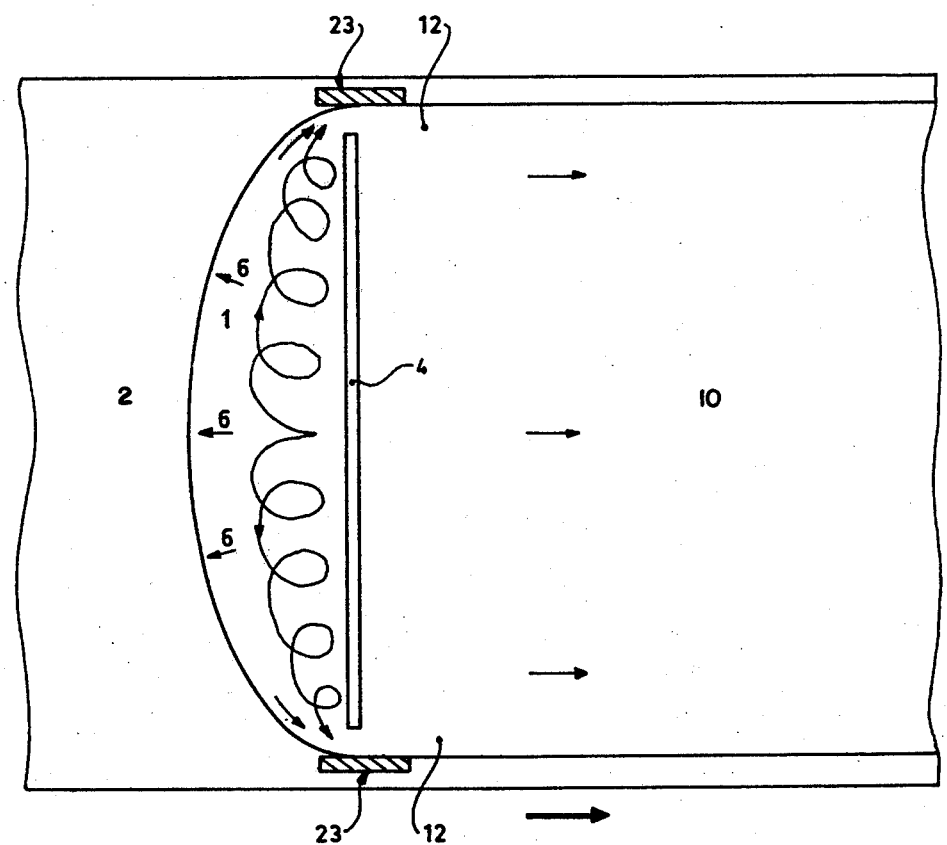
FIG. 2 is a plan view of the pocket formed on the substrate.

In FIGS. 1 and 2, the pocket 1 is shown already formed and in a stable condition between the substrate 2 and the distributor of the liquid substance 3. The actual meniscus or pocket 1 spreads upstream of the casting slot 4 and comprises two main zones A and B and an intermediate zone C. Zone A is formed from a portion of the flow of material 5 that comes from the upstream side of the casting slot and flows upstream along an upper path 6, then comes in contact with substrate surface 7 and is finally entrained along a lower path 8 to form the lower portion 9 of the layer 10 being formed. The residence time of the material in this zone is on the order of a few seconds.

Zone B comprises primarily material from a central portion 11 of the stream 4. In this zone, the material flows in a helical or spiral path from the center of the meniscus towards each lateral side. The magnitude of the rotational movement is progressively reduced as the flow nears the edges. The time of transit between the center and the edges is several minutes. The material issuing from Zone B forms the edges 12 of the layer 10 (see FIG. 2).

A third zone C, of lesser importance, located between Zones A and B, contains material coming from a central portion 13 of the stream 4, which at first follows a path that wraps around Zone B. A portion of this flow follows flow path 16 and acquires the helical motion of the material of Zone B. Another portion follows flow path 14 that becomes the intermediate portion 15 of layer 10. The residence time of the material that forms Zone C and flow path 14, is on the order of a few seconds from the time the material emerges from the slot to the instant it forms portion 15 of the layer 10.

The upper portion 17 of the sheet 10 is formed from a direct flow 18 of material coming from the downstream side of the casting slot. The residence time of the material in flow path 18, from the outlet of the slot to the time of formation of later 17, is about one second.

Figures 3, 4:
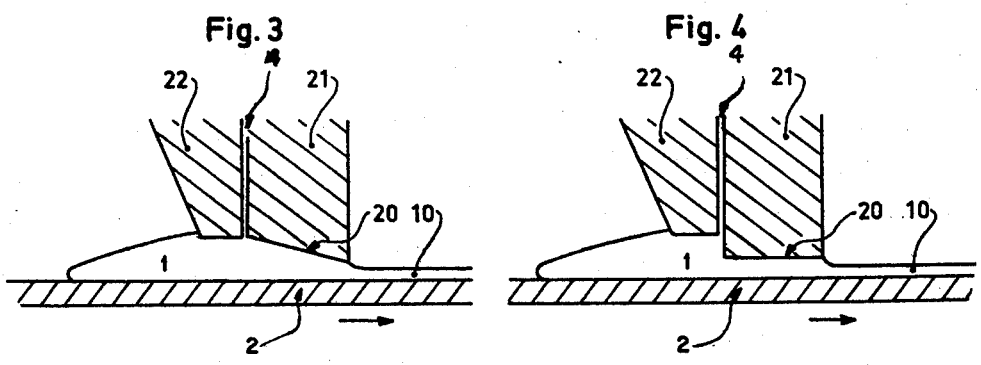
FIGS. 3 and 4 show two other types of casting devices.

When the process is implemented with a casting head and doctor blade, as shown in the illustration, the doctor blade 19 prevents the material from flowing freely downstream and creates a loss of pressure between the slot outlet and the downstream extremity of the casting apparatus. The doctor blade can also serve as an anchoring point for the material, at which point the material is subjected to attenuation by the moving substrate. In this instance, to avoid dead zones, as could be the case in Zone D between the slot exit and passage under the doctor blade, it is preferable that the boundary surface 20 of the casting head not be at a sharp angle to the doctor blade. To accomplish this, a casting device can be used, for instance, wherein the boundary surface 20 of the downstream lip 21 is sloped, as shown in FIG. 3, or a device wherein the downstream lip 21 is closer to the substrate than the upstream lip 22, as shown in FIG. 4.

To stop the cast material from reaching the edges of the substrate 2, means such as pads 23 can be used to limit the width of the formed sheet. Pads that are an integral part of the casting device and which can slide on the casting substrate can be used, for instance.

The central part of the sheet is formed of several strata, with the material in each stratum having a uniform residence time from the casting slot to the moment they form the sheet. Consequently, when they consist of a mixture of components which react to form a polymer, for instance, they can be found in the entire thickness of the layer in closely related stages of polymerization. Thus, optical defects due to differences in the index of refraction are avoided.

The stability of the meniscus or pocket is fundamental to the production of a product of suitable quality. An important advantage of the process of the invention is that the meniscus, besides allowing production of a layer of good optical quality, is also a practical and effective means of control.

The outer shape of the pocket is indeed dependent on the viscosity of the cast material, hence its composition and temperature. Its shape is also dependent on the speed and temperature of the substrate and the rate at which the material is supplied to the substrate. A change in the outer shape of the pocket is indicative of a change in casting conditions. By maintaining a stable convex meniscus, it is possible to ensure production of a product of good optical quality. The control in situ allows for fast action, should the need arise, to restore the proper casting conditions, thus avoiding considerable loss of product.

Adherence of the plastic on the substrate also affects formation of a properly shaped pocket. Depending on the type of material cast and the casting substrate, the surface of the latter can be treated, prior to casting, with adherence primers when the natural adherence between the cast material and the substrate is too low or with release agents when the adherence is too great. For example, organosilanes can be used as primers for casting of a polymer or a mixture of its components on a glass substrate. Stearates, silicones, fluorinated hydrocarbons, paraffin, waxes, and addition polymers of ethylene oxide can be used as release agents. These same products or other suitable products can be used when the casting substrate is made of plastic material, metal, etc. The substrate surface can be treated by wetting the surface with a liquid composition comprising, depending on the case, the primer or the release agent, followed by evaporation of the liquid phase. Different processes can be used to apply the treating composition to the substrate surface. For instance, flow, spray application, etc., can be used.

EXAMPLE

An example of use of this process is given hereinafter, an example in which a layer of a thermosetting polymer, namely a polyurethane, is prepared on a flat, mobile glass substrate.

A flat glass substrate is coated with a solution containing a release agent which can be, for instance, an addition product of ethylene oxide with the following general formula: $R_1-X-(C_2H_4O)_n-R_2$ where $R_1$ is an alkyl radical with about 8 to 18 carbon atoms or an alkyl-aryl radical with 6 to 12 carbon atoms in the side chain; $R_2$ is one of the following groupings: $SO_3M$, $PO_3M_2$, $CO-CH(SO_3M)$, $CO-C_6H_4-COOM$ or $CH_2COOM$, M being an alkali metal; X is one of the following groupings: O, COO or COHN; and n is a whole number between 1 and 100.

The liquid phase is evaporated and the temperature of the glass substrate is concurrently raised to 70° C.

The substrate is moved forward at a uniform rate, for instance, 2 m per minute, and a mixture of the monomers, given hereinafter and previously degassed to prevent formation of bubbles in the subsequently formed layer, is deposited by casting.

1,000 g of a polyether, with a molecular weight of about 450, obtained by condensation of 1,2-propylene oxide with 2,2-bis(hydroxymethyl)-1-butanol and with a free hydroxy radical content of about 10.5 to 12% (for instance, the product sold by Bayer AG under the name "Desmophen 550 U") is mixed with 1,000 g of a biuret of 1,6-hexanediisocyanate with a free isocyanate radical content of about 21 to 22% (for instance, the product sold by Bayer AG under the name "Desmodur N/100").

Prior to mixing the monomers, 23 g of an antioxidant, namely 2,6-di(tert-butyl)-4-methylphenol (for instance, the product sold by Shell under the name "Ionol"), and 0.5 g of a catalyst, namely, dibutyltin dilaurate, are added to the polyether.

The aforementioned mixture is deposited on the substrate at a temperature of about 20° C., at a viscosity of about 800 centipoises, by means of a casting head with a relatively long but narrow slot of constant thickness with perfectly smooth walls and a wall-to-wall distance of a few tenths of a millimeter, in this instance, 0.3 mm. This slot is supplied with material under pressure from a distribution channel having a central feed. This configuration provides a flow of material in the form of a thin and continuous sheet. The casting head used must allow for upstream flow of the material and proper pocket formation; it must therefore have a sufficiently wide space between its lower portion and the substrate, upstream of the slot orifice, when in the casting position above said substrate, to allow formation of the pocket 1. The casting head used can be like one disclosed in FIGS. 1 and 2 of U.S. Pat. No. 4,145,173, the disclosure of which is incorporated herein by reference. A casting head is used in which the downstream lip 22 has a thickness $d_3$ of about 22 mm, while the doctor blade 19 has a thickness $d_4$ of about 5 mm and is so provided that its lower surface is at a distance $d_2$ of about 2 mm lower than the lower surface 20 of the downstream lip. The material to be cast is supplied to the substrate in a continuous sheet-like flow through a narrow slot. The supply of material to the slot is via a means having a single input located centrally, i.e., medially of the edges, of the slot. This results in the flow rate of material in the sheet-like stream being greatest in a central region, intermediate the lateral side edges of the slot.

The desired pocket shape and the different flows of material, as previously described, are produced by setting the casting head at a predetermined height above the substrate; for instance, the distance $d_1$ between the doctor blade 19 and the substrate 2 must be about 0.9 mm for the width of the pocket to be appreciably equal to that of the deposited layer. The shape of the pocket can be altered by making minor adjustments in the temperature of the substrate.

The pocket, which is roughly 40–50 mm in length and must maintain its shape during the entire manufacturing process, must be monitored; the proper shape can be maintained, should the need arise, by making a minor adjustment in the temperature of the casting substrate. In the event the casting composition contains a catalyst, the shape of the pocket can be altered by making minor adjustments in the concentration of the catalyst in the composition.

The material, flowing as a sheet that divides itself into separate flows, is then entrained by the substrate on which its polymerization continues. A layer of polymerized material of uniform thickness, about 0.5 mm, is finally produced. This layer can be readily detached from the substrate. After elimination of the edges, the layer can be used as a sheet in laminated glazing, for instance.

In this manner, uniform layers can be produced, of a width exceeding 1, even 2, meters, which are homogeneous over the major portion of their width, with the exception of the very narrow edges, and also in a wide range of thicknesses, from a few hundredths of a millimeter to a few millimeters.

In accordance with the previous example, the thickness of the formed layer can be determined by the lower downstream extremity of the casting device, for instance, by using a casting head equipped with a doctor blade. In that particular case, the doctor blade can serve as an anchoring point for attenuation of the material by the moving substrate.

The thickness can also be determined by the relative speed of the substrate in relation to the casting device.

In accordance with the process of the invention, one or more successive layers can be formed by casting on a flat surface. A second layer can be deposited on top of the first layer, before or after the latter is completely polymerized or dried. It is therefore possible to form a second layer, for instance, a layer with bonding or adhesive properties, from a thermoplastic polyurethane solution, over the thermosetting polyurethane layer prepared in the previous example; a two-ply sheet of high optical quality, suitable for use in laminated glazing, can therefore be produced. A thermosetting polyurethane layer can also be formed on top of a previously cast bonding layer.

An important advantage of the process of the invention is that the use of leveling agents such as silicone oils, urea-formaldehyde resin solutions, phenolic resins, cellulosic esters, can be eliminated. These products are usually incorporated into fluid casting compositions and provide internal lubrication of the molecules. But they can have a deleterious effect on certain properties of the formed layer, for instance, a decrease in bonding strength, optical quality, etc. By avoiding the use of these products, certain variables involved in the manufacturing process of the cast films can be eliminated, thus resulting in a simplified manufacturing process.

We claim:

1. A method for making a sheet of plastic material, comprising continuously feeding a thin sheet-like flow of a liquid film-forming material onto a flat, moving substrate, said sheet-like flow being disposed transversely to the direction of movement of the substrate, forming a stable pocket of material on the substrate upstream from the zone at which the flowable material is introduced onto the substrate and controlling viscosity, pressure, flow rate of the material, and degree of adherence between the flowable material and the substrate, whereby all the material in the pocket is continuously in motion, establishing a continuous flow in the upper portion of the pocket in a direction essentially opposite the direction of movement of the substrate in order to come in contact with said substrate and be entrained by the latter in the direction of the movement, thus forming the lower portion of the sheet-forming layer, establishing a flow of material forming the central portion of the pocket between the upper and lower paths that continuously flows in a direction essentially transverse to the direction of substrate movement towards the edges of said substrate, and simultaneously establishing the flow of a direct stream of material from the material introduction zone in a downstream tangential relation to the pocket, in order to form the upper portion of the sheet-forming layer.

2. A method as in claim 1, wherein the pocket has a uniform convex curvature, a width substantially equal to the width of the sheet formed on the substrate, and a height greater than the thickness of said sheet.

3. A method as in claim 1 wherein:
the casting substrate is substantially horizontal and the surface of which partially adheres to the cast material so that the flowable material is entrained by the movement of the substrate;
the substrate moves with a uniform forward movement;
and further comprising the step of forming, transversely to the substrate, a thin, continuous, sheet-like flow of the flowable material which is deposited onto the substrate, the width of the flow being slightly narrower than the formed layer, the pressure in the sheet-like flow decreasing progressively from the center to its lateral edges, the amount of material coming from the sheet-like flow and feeding the pocket being equal to the amount of material escaping therefrom by entrainment by the substrate; and
creating a pressure drop downstream of the sheet-like flow.

4. A method as in claim 3, comprising feeding the sheet-like flow of material from a single source.

5. A method as in claim 3, comprising feeding the sheet-like flow of material from a single, central source.

6. A method as in claim 3, characterized in that the flow rate of material in the thin continuous sheet-like material is greater in the center.

7. A method as in claim 1, wherein the shape of the pocket is maintained constant.

8. A method as in claim 7, wherein the shape of the pocket is kept constant by adjusting the temperature of the substrate.

9. A method as in claim 7, wherein the shape of the pocket is kept constant by adjusting the viscosity of the composition.

10. A method as in claim 1 wherein the casting substrate is flat glass.

11. A method as in claim 1 wherein the flowable material is a mixture of components which react during the casting process to form the plastic material.

12. A method as in claim 11 wherein the material is a thermosetting polymer.

13. A method as in claim 1 wherein, after a first sheet of plastic material is formed on the substrate, a second layer of material is cast in a similar manner onto the plastic material.

14. A method of making a thin sheet of plastic material from a liquid mixture of components which react during formation of the sheet, comprising the steps of:
providing a flat, substantially horizontal substrate moving at a uniform rate;
continuously feeding a thin sheet-like flow of the liquid mixture onto the upper surface of the moving substrate with the plane of the sheet-like flow being disposed transversely to the direction of movement of the substrate;
providing sheet forming means downstream of the zone of introduction of the mixture onto the substrate, the sheet forming means extending transversely to the direction of substrate movement and controlling the thickness of the sheet formed on the substrate;
forming a stable pocket of the mixture on the substrate extending upstream from the zone of introduction of the mixture, and controlling the viscosity, pressure, and flow rate of the material, and degree of adherence between the flowable material and the substrate whereby all the material in the pocket is continuously in motion;
feeding the mixture to provide a greater flow at the center of the substrate then toward the edges thereof;
establishing a continuous flow in the upper portion of the pocket in a direction essentially opposite the direction of movement of the substrate in order to come in contact with and be entrained by the substrate in the direction of substrate movement, thus forming the lower portion of the sheet-forming layer;
establishing a flow of a direct stream of the mixture from the zone of introduction in a downstream tangential relation to the pocket in order to form the upper portion of the sheet-forming layer; and
simultaneously establishing continuous flows of the mixture forming the central portion of the pocket in directions essentially transverse to the direction of substrate movement, the latter flows moving along oppositely directed flow paths from substantially the center of the substrate toward the opposite side edges thereof, whereby the mixture from the central portion of the pocket forms the outer edges of the sheet.

15. The invention as claimed in claim 14 wherein the flow of the mixture from the central portion of the pocket is deposited on the substrate beyond the edges of the sheet forming means.

16. The method as in claim 14 wherein the flows of the mixture from the central portion of the pocket rotate during their transverse movement.

17. The method as in claim 14 wherein the plastic material comprises a thermosetting polymer.

* * * * *

UNITED STATES PATENT AND TRADEMARK OFFICE
Certificate

Patent No. 4,283,363                                Patented August 11, 1981

Pierre Boudenant, Heinz Scholl and Michel Zortea

Application having been made by Pierre Boudenant, Heinz Scholl and Michel Zortea, the inventors named in the patent above identified, for the issuance of a certificate under the provisions of Title 35, Section 256, of the United States Code, adding the name of Rudolf Pelzer as a joint inventor, and a showing and proof of facts satisfying the requirements of the said section having been submitted, it is this 8th day of Feb. 1983, certified that the name of the said Rudolf Pelzer is hereby added to the said patent as a joint inventor with the said Pierre Boudenant, Heinz Scholl and Michel Zortea.

Fred W. Sherling,
*Associate Solicitor.*